United States Patent
Smithies et al.

(10) Patent No.: US 8,333,826 B2
(45) Date of Patent: *Dec. 18, 2012

(54) PLEATABLE PTFE FILTER MEDIA WITH EPTFE MEMBRANE

(75) Inventors: Alan Smithies, Overland Park, KS (US); Karmin Lorraine Olson, Kansas City, MO (US)

(73) Assignee: BHA Group, Inc., Kansas City, MO (US)

( * ) Notice: Subject to any disclaimer, the term of this patent is extended or adjusted under 35 U.S.C. 154(b) by 347 days.

This patent is subject to a terminal disclaimer.

(21) Appl. No.: 12/703,263

(22) Filed: Feb. 10, 2010

(65) Prior Publication Data

US 2011/0192125 A1 Aug. 11, 2011

(51) Int. Cl.
  *B01D 53/22* (2006.01)
(52) U.S. Cl. .................. 96/11; 55/486; 55/521
(58) Field of Classification Search .......... 55/486, 55/521; 95/43, 45; 96/4, 10–11; 428/220
See application file for complete search history.

(56) References Cited

U.S. PATENT DOCUMENTS

| | | | |
|---|---|---|---|
| 4,840,838 A | 6/1989 | Wyss | |
| 4,983,434 A | 1/1991 | Sassa | |
| 5,478,372 A | 12/1995 | Stark | |
| 5,898,981 A * | 5/1999 | Legare | 28/111 |
| 5,989,432 A * | 11/1999 | Gildersleeve et al. | 210/650 |
| 6,214,093 B1 * | 4/2001 | Nabata et al. | 96/11 |
| 6,752,847 B2 | 6/2004 | Smithies | |
| 6,808,553 B2 | 10/2004 | Kawano et al. | |
| 7,374,796 B2 | 5/2008 | Smithies | |
| 2002/0027102 A1 | 3/2002 | Robillard | |
| 2006/0090650 A1 * | 5/2006 | Yamakawa et al. | 96/11 |
| 2007/0173159 A1 | 7/2007 | Miwa et al. | |
| 2011/0146493 A1 * | 6/2011 | Thottupurathu et al. | 96/12 |
| 2011/0192125 A1 * | 8/2011 | Smithies et al. | 55/486 |

FOREIGN PATENT DOCUMENTS

WO 9602313 A1 2/1996

OTHER PUBLICATIONS

"Heat-Resistant Cloth, Pleated Bag Filter and Method for Producing Heat-Resistant Cloth." Patent Abstracts of Japan, publication No. 2005281904A. Date of publication: Oct. 13, 2005 Application No. 2004098100.

* cited by examiner

*Primary Examiner* — Duane Smith
*Assistant Examiner* — Karla Hawkins
(74) *Attorney, Agent, or Firm* — Cooper Legal Group, LLC

(57) ABSTRACT

A filter media including a scrim, a polytetrafluoroethylene (PTFE) media substrate upon the scrim, and a layer of expanded polytetrafluoroethylene (ePTFE) membrane adhered to the PTFE media substrate on the scrim. The filter media is pleatable and has air permeability of approximately 3-10 cubic feet/min at a 0.5 inch H2O pressure drop and an original filtration efficiency greater than 99.0% when tested in an unused, unpleated condition with a 0.3 micron challenge aerosol at a flow rate of 10.5 feet/min and when tested after a cleanable dust performance test according to ASTM D6830.

8 Claims, 4 Drawing Sheets

US 8,333,826 B2

PLEATABLE PTFE FILTER MEDIA WITH EPTFE MEMBRANE

BACKGROUND OF THE INVENTION

1. Field of the Invention

The present invention relates generally to air filters, and more particularly, to pleatable air filters that can operate in baghouses in various environments.

2. Discussion of the Prior Art

Air filters are known and used in many different applications, including baghouses. Each baghouse may be provided with one or more air filters for filtering dirty air in various environments. Current technology filters include standard round glass filter bags, pleated glass filter elements, filter cartridges, etc. Generally, glass-based filter media is predominant with these types of filters when used in a high temperature environment, such as involving cement or minerals processing, incineration, etc. However, improvements in performance over glass-based filter media may desired for environments involving high temperatures and having acidic or alkaline gas streams or dust.

BRIEF DESCRIPTION OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect, the present invention provides a filter media including a scrim, a polytetrafluoroethylene (PTFE) media substrate upon the scrim, and a layer of expanded polytetrafluoroethylene (ePTFE) membrane adhered to the PTFE media substrate on the scrim. The filter media is pleatable and has air permeability of approximately 3-10 cubic feet/min at a 0.5 inch H2O pressure drop and an original filtration efficiency greater than 99.0% when tested in an unused, unpleated condition with a 0.3 micron challenge aerosol at a flow rate of 10.5 feet/min and when tested after a cleanable dust performance test according to ASTM D6830.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION OF THE INVENTION

Figure 1:
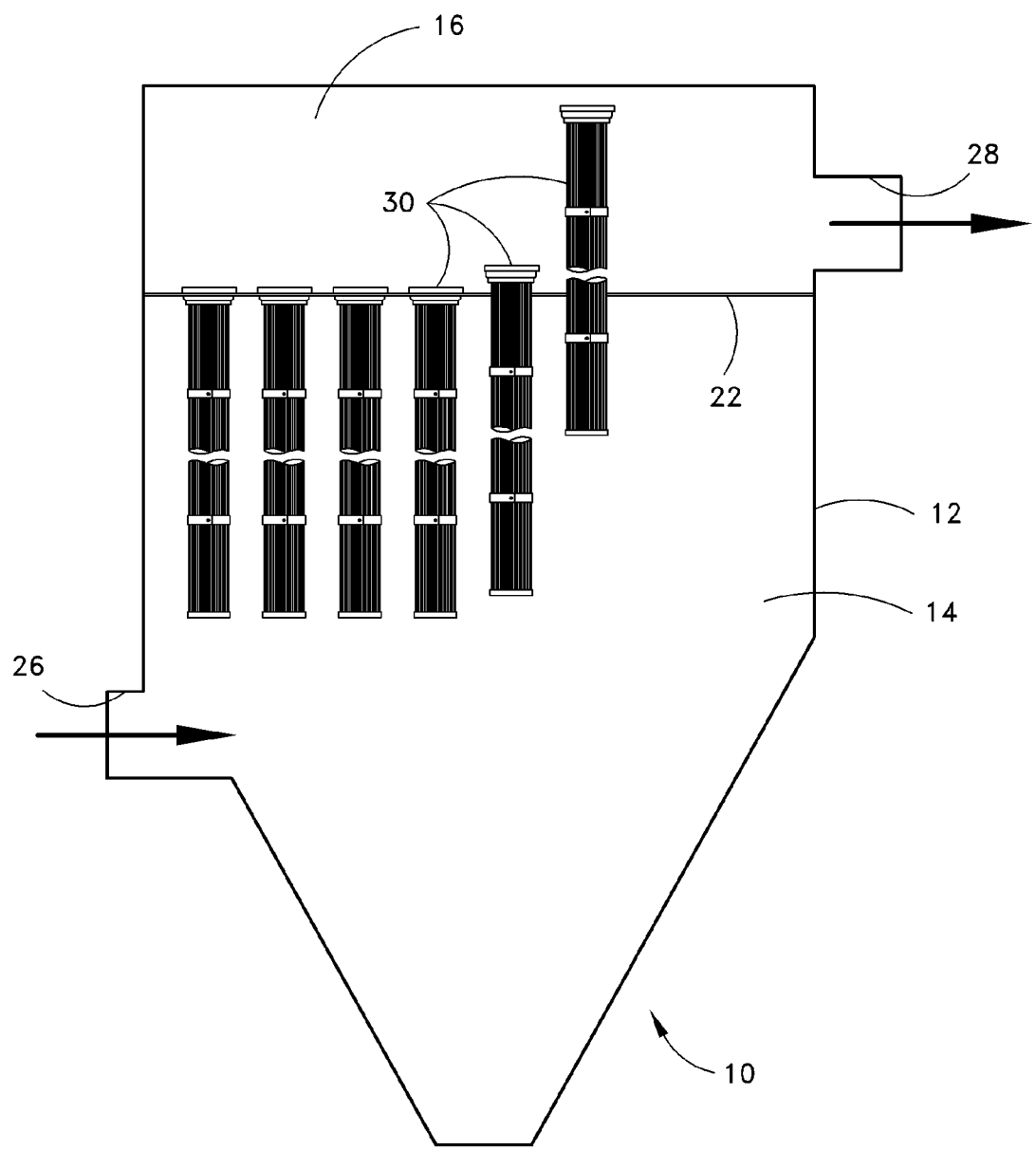
FIG. 1 illustrates a perspective view of an example baghouse having a plurality of filter cartridges and incorporating at least one aspect of the present invention.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

FIG. 1 schematically shows an example interior of a baghouse 10 as an environment within which the present invention may be utilized. The baghouse 10 may be defined by an enclosed housing 12 and can be divided into two sections, a dirty air plenum 14 and a clean air plenum 16. The dirty air plenum 14 and the clean air plenum 16 may be placed in fluid communication with each other and separated by a tubesheet 22, which is a wall, a divider, or the like. The dirty air plenum 14 is in fluid communication with a dirty air inlet port 26 allowing unfiltered air to enter the baghouse 10 through the dirty air inlet port. The clean air plenum 16 is in fluid communication with a clean air outlet port 28 allowing filtered air to exit the baghouse 10 through the clean air outlet port. The dirty air plenum 14 and the clean air plenum 16 may be arranged in fluid communication via one or more circular openings formed in the tubesheet 22. Each opening may be sized to accept and hold a filter cartridge 30. The tubesheet 22 prevents the passage of air through the tubesheet. Instead, air may pass from the dirty air plenum 14 to the clean air plenum 16 through the filter cartridges 30. It is to be appreciated that the baghouse 10 may be varied and the presented example is not to be taken as a limitation upon the present invention.

In the shown example of FIG. 1, six filter cartridges 30 are shown. However, the baghouse may include any number (i.e., one or more) of filter cartridges 30. The filter cartridges 30 are generally elongate may be arranged parallel (e.g., axes of elongation) to each other in a substantially vertical manner. The filter cartridges 30 are capable of filtering air to remove a variety of dry elements. For instance, the filter cartridges 30 may be used, but are not so limited, to filter hot gas(es) with temperature ranging from 400° F. to 500° F. and with temperature surges up to 550° F. In addition, the filter cartridges 30 may be used in applications at the stated temperatures in environments that may have gas streams and/or have dust which are acidic or alkaline. These applications may include, but are not limited to, carbon black processing, titanium dioxide processing, etc.

Figure 2:
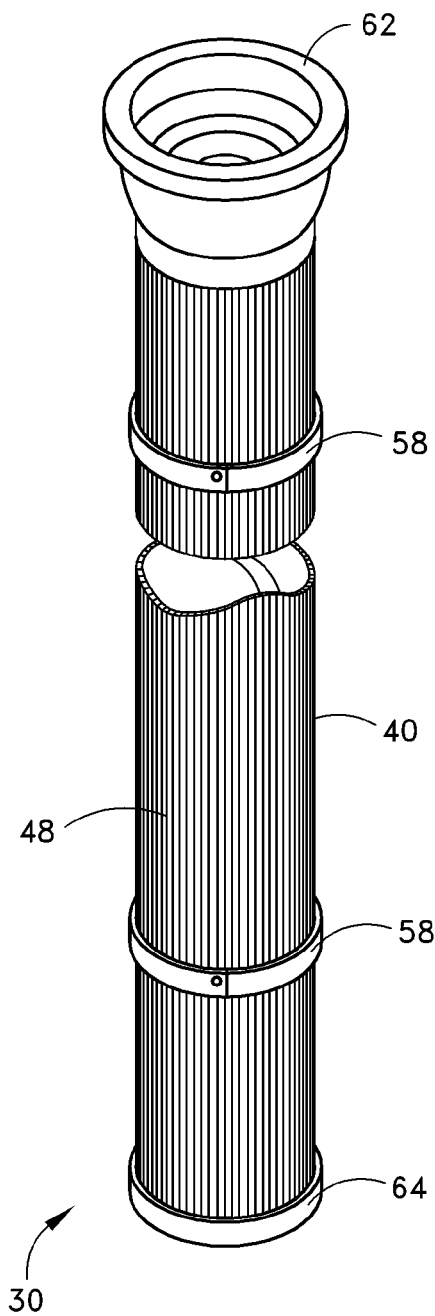
FIG. 2 illustrates an enlarged, perspective view of an example filter cartridge from the example of FIG. 1 and incorporating at least one aspect of the present invention.
Figure 3:
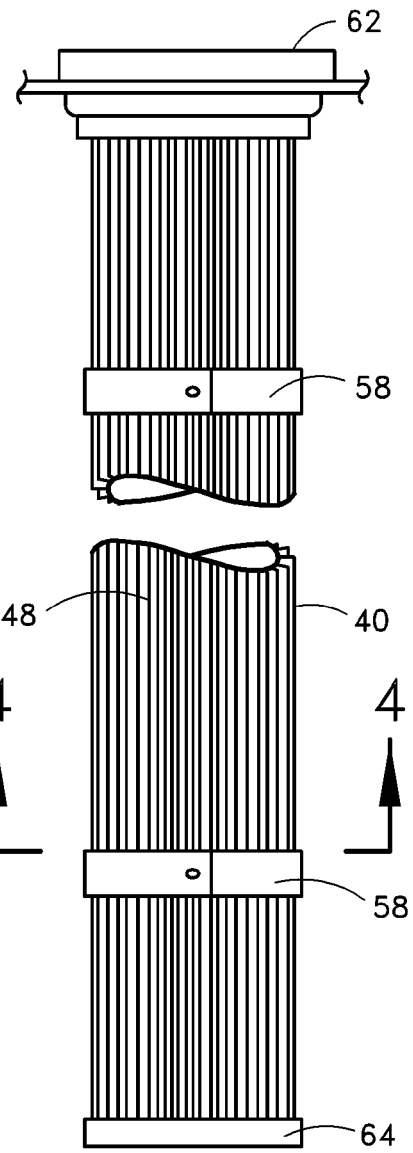
FIG. 3 illustrates a side view of the example filter cartridge of FIG. 2.
Figure 4:
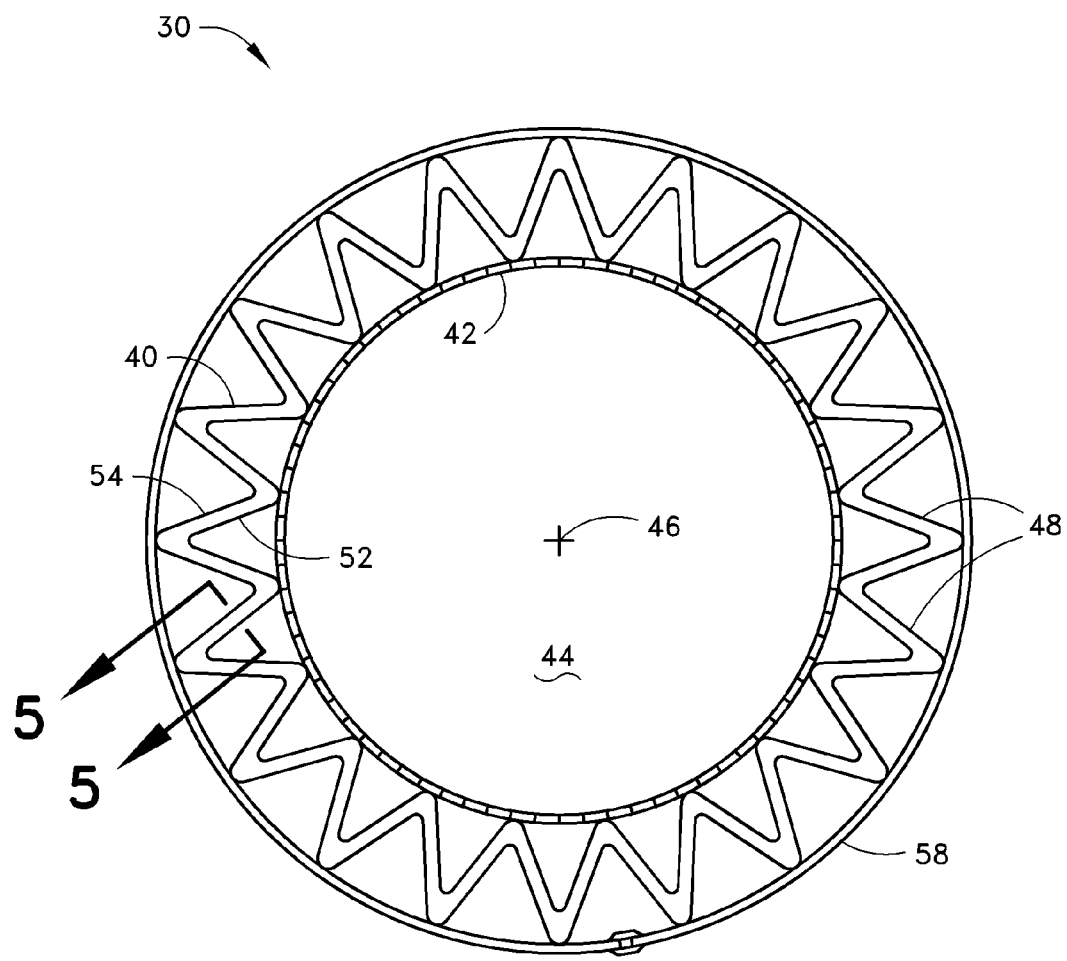
FIG. 4 illustrates an enlarged, cross-sectional view of the filter cartridge taken along line A-A of FIG. 3 and shows a composite filter media in accordance with at least one aspect of the present invention.

As shown in FIGS. 2-4, a representative example filter cartridge 30 includes a filter media 40 in accordance with one aspect of the present invention. In the shown example, the filter media 40 is arranged around an inner core 42 (FIG. 4). The inner core 42 defines an elongated central passageway 44 formed within the filter cartridge 30. The elongation is along a center axis 46. The core 42 may be made of a number of different metal materials, such as steel, titanium, or the like, and may be sufficiently stiff to provide some support to the filter cartridge 30. The core 42 includes openings on its surface to allow for the passage of air through the core. For instance, the core 42 may include a plurality of perforations, apertures, holes, etc. to allow air to pass from the exterior of the core to the central passageway 44.

In the shown example (FIGS. 2-4), the filter media 40 is arranged as a tube to encircle the inner core 42 and has a plurality of pleats 48. The pleats 48 are elongated parallel to the axis and extent in a zig-zag pattern toward and way from the center axis 46. The segments between the pleat bends are essentially flat segments. The filter media 40 has an inner surface 52 and an outer surface 54. In the shown embodiment, a portion of the inner surface 52 engages and/or is adjacent to the inner core at the radially inward extent of the pleats 48.

In the shown example, attachment means 58 may be provided around the filter media 40. The attachment means 58 may help retain the filter media 40 in place around the inner core 42. In one specific example, the attachment means 58 may include an adhesive to secure the inner surface 52 at the inward extent of the pleats 48 to the exterior of the inner core 42. In another example, as shown in FIGS. 2-3, the attachment means 58 may include one or more retaining straps used to hold and/or secure the filter media 40 in place. Such retaining straps may include a number of materials with a high tensile strength, including an extruded polymer, woven polyester, metal, high temperature fabric, etc. Also, such retaining straps may be secured around the circumference of the filter media in a number of locations, such as at a central position between the bottom and top of the filter cartridge. Similarly, more than one retaining strap may be provided for securing the filter media, as in the shown example, two retaining straps are used.

Each retaining strap may include apertures formed at each end of the strap. In one example, a securing means, such as an eyelet assembly with a rivet, may be provided for passing through each aperture and holding the retaining strap in place. In the alternative, the securing means may include a nut and bolt assembly, screw assembly, etc. for securing the strap. In yet another example, the ends of the retaining strap may instead be welded together to hold the strap in place. Once secured by the attachment means, by welding, etc., the retaining strap may be placed around the filter cartridge. The interior of the retaining strap or, in the alternative, the outer surface of the filter media, may be coated with an adhesive. The adhesive may act to hold the retaining strap in place against the outer surface of the filter media, thereby limiting any sliding of the retaining strap.

The filter cartridge 30 may also include one or more end caps 62, 64 (upper and lower) at either or both ends of the filter cartridge. The end caps 62, 64 may act to allow and/or prevent the passage of air through an end of the filter cartridge and ensure that air flow is only through the filter media 40 to aid the filtering process. The caps may include rigid members, seals, etc. as will be appreciated by the person of ordinary skill in the art. Also in the shown example, the lower end cap 64 provides for complete blocking, whereas the upper end cap 62 provides for perimeter sealing and is open at a center to permit air flow out from the center passageway 44.

Figure 5:
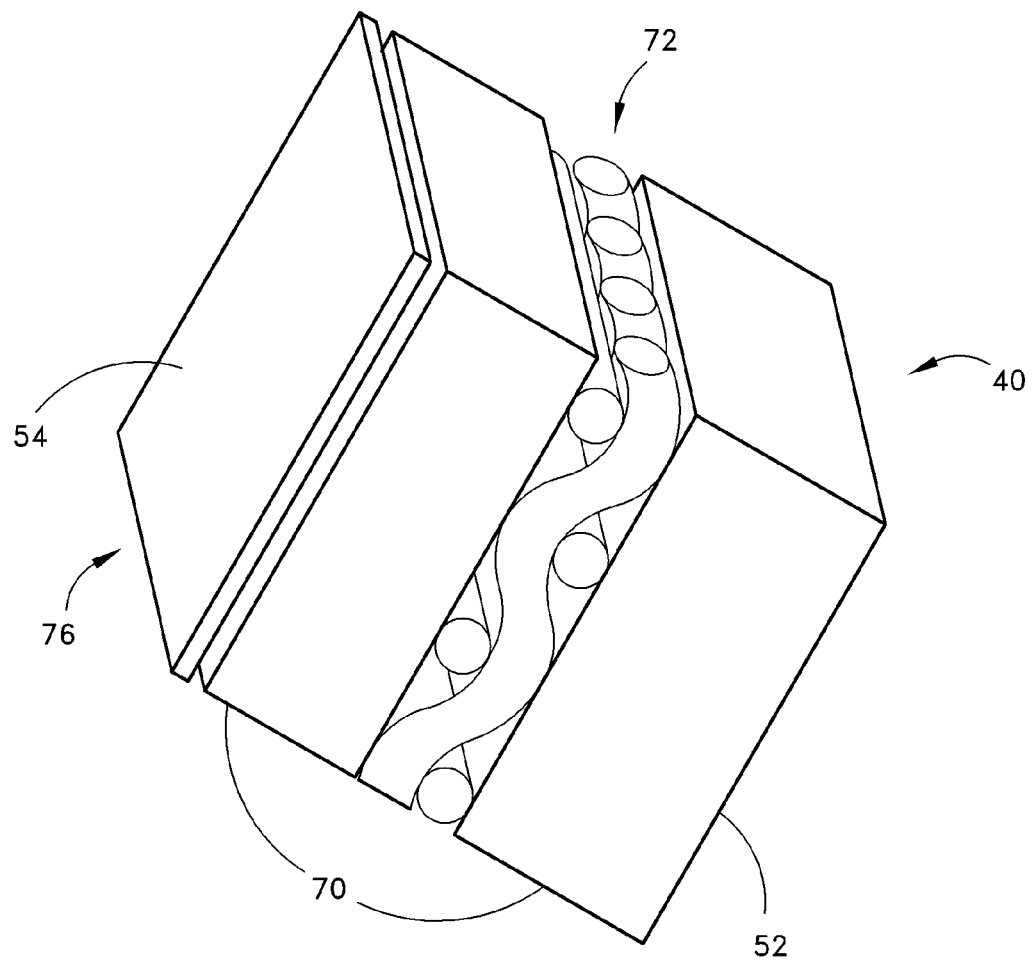
FIG. 5 illustrates an enlarged, perspective section view of the composite filter media taken along line 5-5 in FIG. 4.

Attention is directed to FIGS. 4 and 5, which show particulars of one example composite filter media 40 in accordance with at least one aspect of the present invention. The filter media 40 includes a polytetrafluoroethylene (PTFE) media substrate 70. In one example which is shown, a wire mesh scrim 72 is provided. In one specific example, the PTFE material of the substrate 70 is provided upon each side of the wire mesh scrim 72 to sandwich the scrim within the substrate. This configuration may be provided by entangling the PTFE media substrate 70 into the wire mesh scrim 72.

The scrim 72 may be made of woven wires and the wires may be metal. Some examples of materials for the scrim 72 are steel, titanium, or the like. The scrim 72 provides air flow openings to allow for the passage of air to allow air to pass in the direction from a dirty side (exterior) to a clean side (interior) of the filter media 40. The scrim 72 also provides rigidity to the filter media 40. Such rigidity permits the filter media 40 to be formed into a shape and to retain the formed shape. In particular, the filter media 40 may be formed and retained in a shaped that is pleated as shown with FIGS. 1-4.

Turning again to FIG. 5, a layer of expanded polytetrafluoroethylene (ePTFE) membrane 76 is thermally laminated upon one surface (e.g., a surface toward a "dirty" side of the composite filter media 40) of the PTFE media substrate 70. As such the outer surface 54 of the filter media 40 is at the ePTFE membrane 76 and the inner surface of the filter media is at the PTFE media substrate 70. The lamination of the ePTFE membrane 76 to the PTFE media substrate 70 may be provided by thermal bonding. The ePTFE membrane 76 is a layer that is much thinner than the PTFE media substrate 70. Also, the ePTFE membrane 76, by itself (i.e., not laminated to the PTFE media substrate), has little or no rigidity.

As mentioned, the composite filter media may be formed in a generally tubular shape and include a number of pleats. The inner surface of the pleats may be positioned adjacent to the inner core while the outer surface may be adjacent to the retaining straps. The composite filter media is rigid to retain the shape (i.e., cylindrical).

The filter media may have properties including an air permeability ranging between 3-10 cubic feet/min at 0.5" H20 pressure drop. Original filtration efficiency may be greater than 99% when tested both in unused flat sheet (unpleated) form with a 0.3 micron challenge aerosol at a flow rate of 10.5 feet/min and also after a cleanable dust performance test as found with ASTM D6830. Such is equivalent to a filtration efficiency of at least 99% at flat segments between pleat bends when tested with the same 0.3 micron challenge aerosol at a flow rate of 10.5 feet/min.

A method of producing the PTFE media substrate 70 may be by a spinlacing process. PTFE staple fibers may initially be carded. Next, the staple fibers may be consolidated in to a filter felt via the use of highly pressurized water jets. The filter felt may again include a number of materials, including PTFE felt. At this point, the PTFE staple fibers and filter felt together include the PTFE media substrate. The PTFE media substrate may be, but need not be, treated with the stiffening, pleatable resin. Instead, the PTFE fibers may be consolidated on to a scrim that may render the media pleatable to form a hydroentangled media. The hydroentangled media may then be post treated with a fluoropolymer resin to allow for thermal lamination of the layer of ePTFE membrane 76. It is to be appreciated that the media does not need to be treated, with a fluoropolymer resin, however, as the resin allows easier thermal lamination.

The stiffening resins may include polyimide (PI) based resins. Polyimides are a generic class of condensation polymers derived from bifunctional carboxylic acid anhydrides and primary diamines. They contain an 'imide' linkage, —CO—NR—CO—, as a linear or heterocyclic unit along the polymer backbone. The heterocyclic structure is usually present as a five or six membered ring condensed with benzene (phthalimides) or naphthalene (naphthylimides).

Polyimides include but are not limited to the generic classes of polyamideimides (PAI), polyetherimides (PEI) and polybismaleimides (PBMI). PAI's are high performance polymers containing both the 'imide' linkage and 'aminde' (—CO—NH—) linkages in the polymer backbone. PAI resins are produced by solution condensation of aromatic trichlorides with aromatic diamines. PEI's are condensation polymers produced from reactions of bisphenols and dinitrobisimides. PEI polymers contain both the 'imide' and 'ether' (—O—) linkages in the polymer backbone. The ether linkage may improve ease of processing and flexibility. PBMI's are generally prepared from the two-step reaction of maleic anhydride and diamines in the presence of acetic anhydride and catalytic amounts of nickel acetates and triethylamine. Polyimides include both thermoset and thermoplastic polymers that can be engineered to suit specific end-use performance requirements.

The stiffening resin may be utilized in combination with any substrate capable of withstanding the conditions of the particular filtering application. For high temperature applications, this may include polymer substrates such as polyarylene sulfides, polyimides, aramids, polyamides, glass and mixtures or blends thereof. In addition, a blend of polyphenylene sulfide (PPS), a subclass of polyarylene sulfides, may be used with greater than 10% aramid, polyimide, acrylic, pre-oxidized acrylic, or similar polymer and mixtures thereof. In the examples, the treated filter media may be pleated by any suitable method, including by a blade, push bar pleater, or the like. Due to the high glass transition temperature of polyimides, the temperature during the pleating process may be raised to 430° F., depending on the particular polyimide used. After subsequent cooling, the stiffening resin may help the filter media retain a pleated structure. In the alternative, the filter media may include the scrim by way of the spinlacing process as the sole means for retaining. The scrim may reduce the need for stiffening resin application and may allow the filter media to be pleated by any suitable method, including by a blade, push bar pleater, or the like.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. A filter media including:
  a scrim;
  a polytetrafluoroethylene (PTFE) media substrate upon the scrim; and
  a layer of expanded polytetrafluoroethylene (ePTFE) membrane adhered to the PTFE media substrate on the scrim;
  the filter media is pleatable and has air permeability of approximately 3-10 cubic feet/min at a 0.5 inch H2O pressure drop and an original filtration efficiency greater than 99.0% when tested in an unused, unpleated condition with a 0.3 micron challenge aerosol at a flow rate of 10.5 feet/min and when tested after a cleanable dust performance test according to ASTM D6830.

2. A filter media as set forth in claim 1, further including a stiffening agent including of a polyimide adapted for treating the polytetrafluoroethylene (PTFE) media substrate.

3. A filter media as set forth in claim 2, wherein the stiffening agent includes polyamideimides (PAI).

4. A filter media as set forth in claim 3, further including a fluoropolymer (FP) resin adapted for treating the polytetrafluoroethylene (PTFE) media substrate.

5. A filter media as set forth in claim 4, wherein the polytetrafluoroethylene (PTFE) media substrate is thermally laminated to the layer of expanded polytetrafluoroethylene (ePTFE) membrane.

6. A filter media as set forth in claim 1, wherein the scrim is metal.

7. A filter media as set forth in claim 6, further including a fluoropolymer (FP) resin adapted for treating the polytetrafluoroethylene (PTFE) media substrate.

8. A filter media as set forth in claim 7, wherein the polytetrafluoroethylene (PTFE) media substrate is thermally laminated to the layer of expanded polytetrafluoroethylene (ePTFE) membrane.

* * * * *

UNITED STATES PATENT AND TRADEMARK OFFICE
CERTIFICATE OF CORRECTION

PATENT NO.         : 8,333,826 B2
APPLICATION NO.    : 12/703263
DATED              : December 18, 2012
INVENTOR(S)        : Alan Smithies et al.

It is certified that error appears in the above-identified patent and that said Letters Patent is hereby corrected as shown below:

In Column 4:

Line 56, please delete "PAT" and insert therefore --PAI.--

Signed and Sealed this
Nineteenth Day of February, 2013

Teresa Stanek Rea
*Acting Director of the United States Patent and Trademark Office*